March 24, 1970     H. BULLARD     3,502,151
GRASS PLOW
Filed Sept. 11, 1967     3 Sheets-Sheet 1
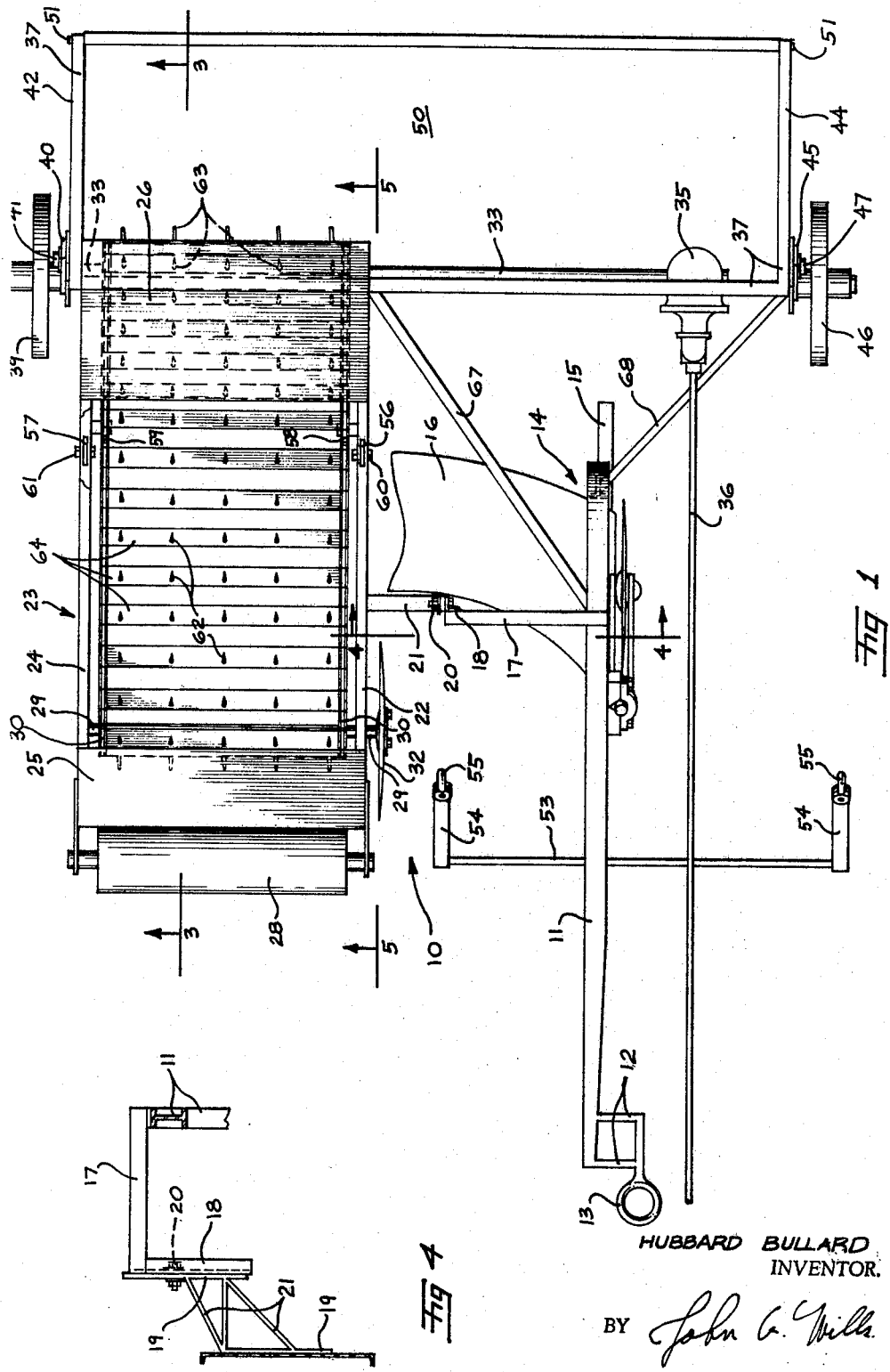
HUBBARD BULLARD
INVENTOR.
BY
ATTORNEY.

March 24, 1970
H. BULLARD
3,502,151
GRASS PLOW
Filed Sept. 11, 1967
3 Sheets-Sheet 2
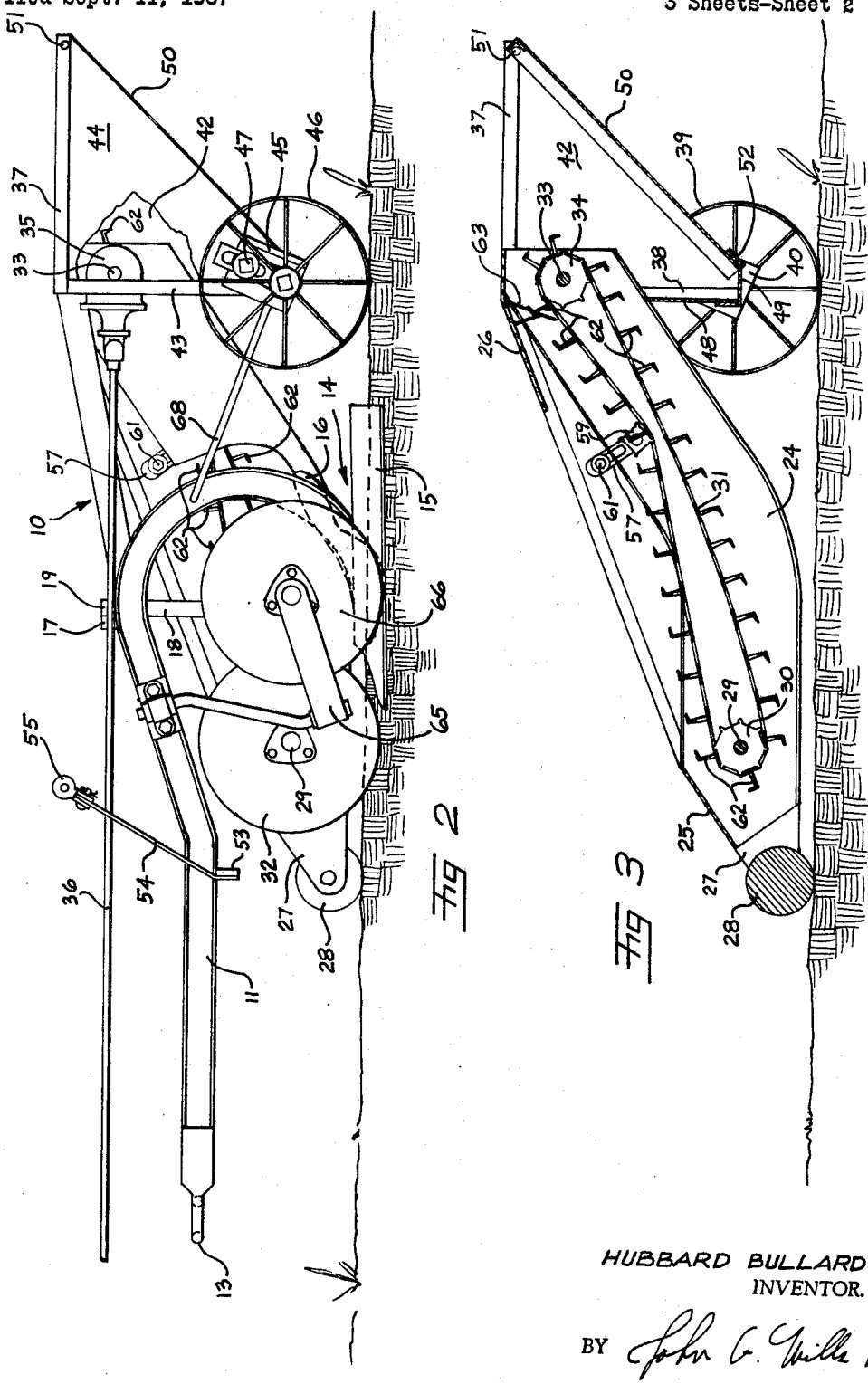
HUBBARD BULLARD
INVENTOR.
BY
ATTORNEY.

March 24, 1970
H. BULLARD
3,502,151
GRASS PLOW
Filed Sept. 11, 1967
3 Sheets-Sheet 3
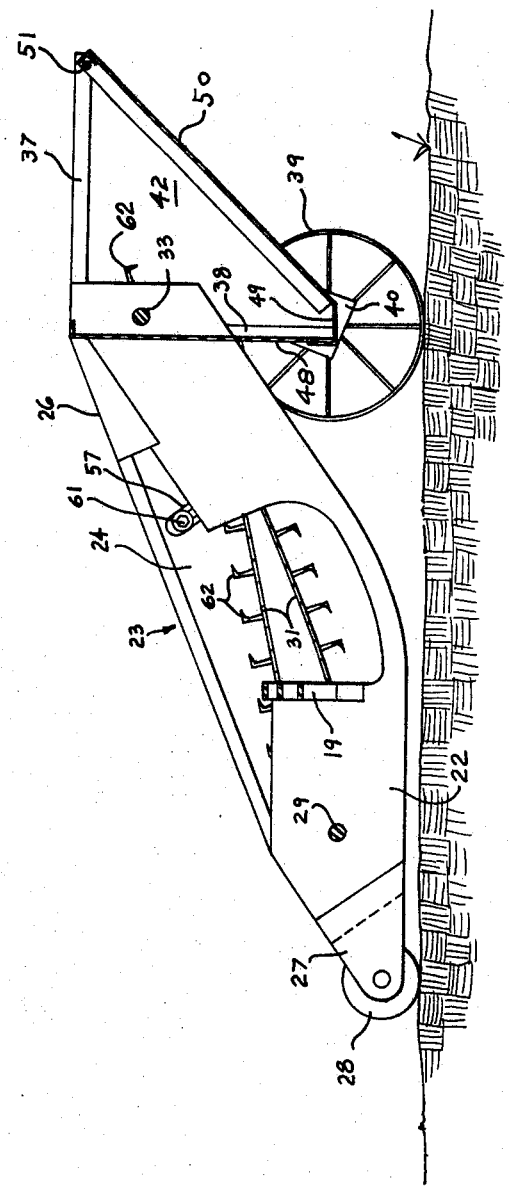
HUBBARD BULLARD
INVENTOR.
BY
ATTORNEY.

3,502,151
GRASS PLOW
Hubbard Bullard, 2005 Elizabethtown Road,
Lumberton, N.C.
Filed Sept. 11, 1967, Ser. No. 666,630
Int. Cl. B65g 47/44; A01b 17/00
U.S. Cl. 172—33                                    10 Claims

ABSTRACT OF THE DISCLOSURE

In abstract, a preferred embodiment of this invention is a plow type agricultural implement for removing grass from a field including a toothed conveyor mounted laterally adjacent the plow for conveying grass laden earth through separator means and into a hopper.

---

This invention relates to agricultural implements and more particularly to devices for eliminating grass in fields that are to be cultivated.

In the past, various means and methods have been used in attempts to rid fields of undesired plant growths. Some of these growths may be, for all practical purposes, eliminated by plowing the field with a relatively deep running plow which turns the earth over as it feeds off the mold-board thereby killing by removing the sunlight. Other means have been used to kill the plants such as using chemical compounds in either spray or dust forms. These substances, however, have not only been found to be in many cases harmful to persons later using the products of the cultivated field but also, if strong enough to eliminate the undesirable plant growths, it will poison the earth so that the desirable planted crops will either not grow at all or will be killed.

There are certain type of grasses along with other undesirable plant growths, which are not adversely effected by plowing under and which in fact thrive on such treatment. These grasses also appear to be substantially immune to elimination by commonly known chemicals. Some of these varieties which have been particularly troublesome in the Southern United States are *Cynodon dactylon* commonly referred to as mooders grass, wire grass or Bermuda grass and *Cyperus rotundus* commonly known as nut grass since both of these types have extensive branching of their root stocks which causes an almost impenetrable mat or mass of interconnecting systems which spread very rapidly and heretofore have been extremely difficult if not impossible to remove from cultivated areas.

The present invention has been developed after much research and study into the above mentioned problems and is designed to eliminate both mooders grass and nut grass as well as other undesirable growths in a field about to be cultivated. In doing so, applicant's invention substantially rids the top soil to a depth of six inches to a foot of all roots, sticks and rocks of any substantial size or length as well as breaking up any large clumps or clogs of earth thereby, in one operation, completely preparing the field for planting.

It is, therefore, an object of the present invention to provide an agricultural implement capable of removing plant varieties having interconnecting root systems from land about to be cultivated without impeding or otherwise affecting the growth of the later planted crop.

Another object of the present invenion is to provide a device for cultivating land which both removes undesirable plant growths and other impurities while at the same time breaks up the soil adequately to allow immediate planting without further cultivation.

A furher object of the present invention is to provide a plant growth removing device including a bottom type plow capable of turning the plowed swath into a chain type separator.

Another object of the present invention is to provide a grass removing agricultural implement adapted to be towed behind a tractor or similar type vehicle with a separating mechanism driven by the power take-off of such vehicle.

Another object of the present invention is to provide a grass removing implement having means for cutting the root systems of such grass prior to the removal operation.

Other objects and advantages of the present invention will become apparent and obvious from a study of the following description and the accompanying drawings which are merely illustrative of the present invention.

In the drawings:

FIG. 1 is a top plan view of a preferred embodiment of the earth and grass separating implement of the present invention;

FIG. 2 is a side elevational view of the same;

FIG. 3 is a section taken through lines 3—3 of FIG. 1;

FIG. 4 is a section taken through lines 4—4 of FIG. 1; and

FIG. 5 is a section taken through lines 5—5 of FIG. 1.

With further reference to the drawings, a plow type grass separator indicated generally at 10 is disclosed having a question mark shaped tongue-frame member 11 terminating at one end in off-set members 12 and eyelet shaped lunette 13. The purpose of the off-set is to compensate for the drag of the plow during its operation as will be hereinafter described.

The opposite end of tongue-frame member 11 from lunette 13 acts as a plow beam upon which is mounted what is commonly referred to as a bottom plow and is indicated generally at 14. This plow is composed of a land-side 15 and a mold-board 16.

Fixedly secured to the upper portion of tongue-frame member 11 is laterally disposed upper connecting member 17 with depending member 18 fixedly secured thereto. This lateral member may be L-shaped in cross section to give it added strength.

As particularly shown in FIGS. 4 and 5, lower connecting member 19 is fixedly secured to inner wall portion 22 of the separator unit indicated generally at 23 thereby supporting the same.

The separator unit is composed of inside wall 22, outside wall 24, front cover 25 and rear cover 26. For safety reasons or should it become otherwise desirable, a removable or hinged cover may be placed between said front cover and said rear cover thereby completely enclosing the upper portion. As will be noted, the front and rear sides are opened as is the bottom portion thereof. The purpose of these open areas will be hereinafter explained in more detail.

Fixedly secured to the front portion of walls 22 and 24 are a pair of forwardly projecting bracket means 27 between which is rotatively mounted roller 28. This roller not only supports the forward portion of the unit 23, but it also, through adjustment in the connection between upper connecting member 17 and lower connecting member 19, controls the depth in the ground at which plow 14 operates.

Mounted in the forward portion of unit 23 is a shaft 29 upon which a pair of sprockets 30 are rotatively mounted. These sprockets are adapted to carry chain conveyor 31 as will be hereinafter described in more detail. Shaft 29 may be extended through wall 22 to the exterior of unit 23 a short distance and have rotatably mounted on the end thereof a colter 32 particularly as disclosed in FIGS. 1 and 2.

A rotatable shaft 33 is mounted through wall 22 at the rear portion thereof. A pair of sprockets 34 are fixedly secured to this shaft and are adapted to carry the other end of chain conveyor 31 from sprockets 30. The tension on this chain may be set by adjusting slip plates 56 and 57 which carry idle wheels 58 and 59. The bolts 60 and 61 which respectively pass through walls 22 and 24 secure their respective slip plates and rotatively mounted idle wheels in their preset adjusted positions.

A right angle gear box 35 is operatively connected to the end of shaft 33 opposite where it enters unit 23. This gear box is adapted to be driven by drive shaft 36 which is rotated by means (not shown) such as the power take-off of a tractor (not shown).

A U-shaped upper frame 37 is provided which is fixedly secured along a portion of its length to separator unit 23 adjacent rear cover 26. Depending from an area adjacent wall 24 is frame member 38 to which wheel 39 is adjustably secured by way of slide plate 40 and bolt 41. Frame 38 is held in fixed relationship to separating unit 23 and frame 37 by triangular wall 42. On the opposite end of U-shaped frame 37 is a depending frame member 43 which is held in rigid relationship to member 37 by wall 44. The lower end of depending frame 43 is adapted to support slide plate 45 upon which is fixedly secured an axle which rotatively mounts wheel 46. To hold slide plate 45 in relative fixed position when in operation, a securing means such as bolt 47 may be used. Thus it can be readily seen that wheels 39 and 46 may be adjusted up and down and when such adjustments are coordinated with adjustments between the connecting members 17 and 19, the depth and angle at which plow 14 operates may be accurately controlled and set.

The area defined by frame 37, separating unit 23, and depending frames 38 and 43 is enclosed by a wall or partition 48. Extending from the lower extremity of frame 38 to the lower extremity of frame 43 is a bottom portion 49.

In the area defined by and extending from the ends of U-shaped frame 37, wall portions 22 and 24, and bottom 49 is a hopper closure or door 50 which is pivoted on means such as hinges or pins 51 which extend through openings in the end portions of frame 37.

Whenever the separated grass and other impurities from separator unit 23 have collected in the hopper like container formed by walls 42, 44, 48 and closure 50 is relatively full, the operation of the implement may be stopped and latch means 52 released to allow the lower portion of said closure to swing outwardly and rearwardly from the bottom thereby automatically dumping all of the contents in the hopper. It is not considered necessary to have a top cover on the hopper since it not only would impede the operation of the device should it become overly full but it would also prevent ready observation of the amount of separated plant growth contained therein.

Just forward of the center of tongue-frame 11 is a fixedly secured cross member 53 which in turn has fixedly attached to each of its ends generally upwardly extending lift arms 54. On the upper end of each of these arms is a coupling eyelet 55 which is adapted to connect to the hydraulic or lift mechanism of the operating tractor (not shown) so that the entire implement may be raised and lowered according to the desires of the operator (not shown).

Just rearwardly of cross member 53 is a caster type bracket 65 upon which is rotatively mounted colter 66.

To give added stability and strength to the connection between tongue-frame 11 and the remainder of the implement, brace 67 may be fixedly or pivotably secured between said tongue-frame and frame 37. Likewise, brace 68 may be fixedly or pivotably secured between said tongue-frame and downwardly projecting frame 43.

In actual use of the implement of the present invention, a tractor or similar type vericle (not shown) is connected to lunette 13 with the power lift mechanism of such vehicle being connected to couplings 55. The entire grass separator 10 is then moved into beginning position in the field. The depth of the plow 14 is set by adjusting wheel slide plates 40 and 45 and the relationship between connecting members 17 and 19. The power take-off of the tractor (not shown) is operatively connected to drive shaft 36 to operate conveyor 31.

Being properly connected and adjusted, the tractor tows the separator across the field which causes the earth being plowed by plow 14 to be channeled by mold-board 16 onto conveyor chain 31. Outwardly projecting hooked teeth 62 move the earth upwardly toward a series of downwardly projecting fingers 63 which are alternately spaced between the rows of teeth 62. Part of the dirt which is placed on the rapidly moving conveyor 31 falls through the openings between cross members 64 and since there is no bottom in the separating unit 23 to the ground. As the grass laden earth approaches fingers 63, it will be literally torn apart between teeth 62 and said fingers 63 thereby causing the dirt to fall between the openings in the cross members while the grass is carried on by the teeth into the hopper at the rear of the implement.

In operation, colters 32 and 66 penetrate the earth to a depth adequate to cut a swath in the entangled root systems of the grass or other growths being eliminated. The plow 14 then can easily scoop below the root system level and deliver the root entangled upper layer of soil onto conveyor 31 formed of slats 64. This conveyor is moving as hereinbefore described very rapidly toward fingers 63 and the hopper formed by the various walls and closure 50.

It has been found that in clearing relatively heavy grass from a field, it is necessary to stop at the end of each pass across the field to empty the hopper. This is accomplished by releasing latch means 52 so that closure 50 may swing downwardly and rearwardly to allow the collected trash to gravitate to the ground.

It is obvious that the present invention has the advantage of being relatively inexpensive to manufacture and operate as well as requiring only a minimum amount of maintenance. The present invention also has the advantage of being capable of accomplishing an end result that is far superior to that heretobefore obtainable with a device which is less complicated in construction and operation.

The terms "upper," "lower," "bottom," "top," "front," "rear" and so forth have been used herein merely for convenience in the foregoing specification and in the appended claims to describe the grass eliminating implement and its parts as oriented in the drawings. It is to be understood, however, that these terms are in no way limiting to the invention since the implement may obviously be disposed in many different positions when it is in use.

The present invention may, of course, be carried out in other specific ways than those herein set forth without departing from the spirit and esesntial characteristics of the invention. The present embodiments are, therefore, to be considered in all respects as illustrative and not restrictive and all changes coming within the meaning and equivalency range are intended to be embraced herein.

What is claimed is:

1. A land clearing implement comprising: a bottom type plow means; a grass and earth separator means including a conveyor means having a series of openings therein to allow earth to fall therethrough operatively mounted laterally from and adjacent said plow means; a mold-board forming a part of said bottom plow to turn grass laden earth over onto said separator means; hopper type means communitively mounted adjacent a portion of said separator means to receive the separated grass; a series of longitudinally aligned teeth fixedly secured to and projecting from said conveyor; a cover of substantial area extending forwardly and downwardly from said hopper above a portion of said conveyor adjacent such hopper to channel the grass into the same; a series of fingers downwardly projecting from said cover between said teeth of said conveyor whereby the earth is ripped apart to separate it from intergrowing grasses and other plants; and means for propelling the implement whereby grass and plant invested land may be cleared.

2. The device of claim 1 wherein the plow means is a bottom type plow including a mold-board to turn the grass laden earth over onto the separator means.

3. The device of claim 2 wherein the grass and earth separator means includes a conveyor means having a series of openings therein to allow the earth to fall therethrough while carrying the grass into the hopper means.

4. The device of claim 3 wherein said conveyor includes a series of longitudinally aligned teeth fixedly secured thereto; a cover over a portion of said conveyor adjacent said hopper; and a series of fingers downwardly projecting from said cover between said teeth of said conveyor whereby said earth is ripped apart to separate from intergrowing grasses and other plants.

5. The device of claim 1 wherein the conveyor is driven in the direction of said hopper means by an auxiliary power source.

6. The device of claim 5 wherein the power source is the power take-off of the propelling means.

7. The device of claim 6 wherein the means for propelling the implement is a tractor.

8. The land clearing implement of claim 1 wherein a closure means is provided adjacent a lower portion of said hopper means whereby the same may be readily emptied.

9. The device of claim 1 wherein colter means are rotatively mounted adjacent each side of the plow means whereby the root systems of the plants infesting the land may be cut prior to upturning by said plow means.

10. A land clearing implement comprising: a bottom plow, a pair of colters rotatively mounted one on each side of said plow, a conveyor operatively mounted laterally from and adjacent said plow in such manner that the earth overturned by said plow will fall onto said conveyor; a series of outwardly projecting teeth fixedly secured at one end to said conveyor and having an L-shaped hook on the other end; a cover means over a portion of said conveyor; fingers downwardly projecting from said cover whereby said teeth and said fingers mesh as said conveyor moves; a series of transversely disposed, slot type openings in said conveyor whereby the earth which has been plowed thereonto may fall therethrough while the entangled plant growth is retained; a hopper communitively mounted adjacent the end of travel of said conveyor and mounting said cover which is of substantial area and extends forwardly and downwardly from such hopper to channel the separated grass thereinto whereby the separated growth may be deposited; means for connecting a tractor type vehicle to said implement to pull it across the land to be cleared; and means for connecting said conveyor to the power take-off of said tractor whereby said implement may be properly operated.

References Cited

UNITED STATES PATENTS

| | | | |
|---|---|---|---|
| 1,009,318 | 11/1911 | Johnson | 198—69 X |
| 1,041,052 | 10/1912 | Estey et al. | 172—33 X |
| 1,114,618 | 10/1914 | Jacobson | 172—33 X |
| 1,293,584 | 2/1919 | Vettermann | 172—33 |
| 1,429,563 | 9/1922 | Beuning | 172—33 |
| 1,906,127 | 4/1933 | Reishus | 172—33 X |

ROBERT E. BAGWILL, Primary Examiner

S. C. PELLEGRINO, Assistant Examiner

U.S. Cl. X.R.

172—32; 198—69